(12) United States Patent
Singh et al.

(10) Patent No.: US 7,428,816 B2
(45) Date of Patent: Sep. 30, 2008

(54) WORKING FLUIDS FOR THERMAL ENERGY CONVERSION OF WASTE HEAT FROM FUEL CELLS USING RANKINE CYCLE SYSTEMS

(75) Inventors: Rajiv R Singh, Getzville, NY (US); David P Wilson, East Amherst, NY (US); Gary J Zyhowski, Lancaster, NY (US); Ryan Hulse, Getzville, NY (US)

(73) Assignee: Honeywell International Inc., Morristown, NJ (US)

( * ) Notice: Subject to any disclaimer, the term of this patent is extended or adjusted under 35 U.S.C. 154(b) by 323 days.

(21) Appl. No.: 10/892,913

(22) Filed: Jul. 16, 2004

(65) Prior Publication Data

US 2006/0010872 A1    Jan. 19, 2006

(51) Int. Cl.
*F01K 25/08* (2006.01)
(52) U.S. Cl. .......................................... 60/651; 60/671
(58) Field of Classification Search .................. 60/651, 60/671; 252/67, 68
See application file for complete search history.

(56) References Cited

U.S. PATENT DOCUMENTS

| | | | |
|---|---|---|---|
| 3,707,843 A | 1/1973 | Conner et al. | |
| 3,714,273 A * | 1/1973 | Tullock | 570/130 |
| 3,753,345 A | 8/1973 | Cassidy et al. | |
| 4,080,791 A | 3/1978 | Nadler et al. | |
| 4,541,943 A | 9/1985 | Powell et al. | |
| 4,590,384 A | 5/1986 | Bronicki | |
| 4,628,869 A | 12/1986 | Symsek et al. | |
| 4,736,045 A * | 4/1988 | Drakesmith et al. | 549/380 |
| 4,876,855 A | 10/1989 | Yogev et al. | |
| 5,118,360 A | 6/1992 | Li et al. | |
| 5,254,755 A | 10/1993 | Li et al. | |
| 5,272,879 A | 12/1993 | Wiggs et al. | |
| 5,618,781 A * | 4/1997 | Magid et al. | 510/177 |
| 5,705,716 A * | 1/1998 | Li | 570/134 |
| 6,076,355 A | 6/2000 | Ven et al. | |
| 6,248,823 B1 * | 6/2001 | Hrivnak et al. | 524/462 |
| 6,365,289 B1 * | 4/2002 | Lee et al. | 429/13 |

(Continued)

FOREIGN PATENT DOCUMENTS

DE    2759286    7/1979

(Continued)

*Primary Examiner*—Hoang M Nguyen
(74) *Attorney, Agent, or Firm*—Colleen D. Szuch

(57) ABSTRACT

A process for recovering waste heat which comprises: (a) passing a liquid phase working fluid through a heat exchanger in communication with a process which produces the waste heat; (b) removing a vapor phase working fluid from the heat exchanger; (c) passing the vapor phase working fluid to an expander, wherein the waste heat is converted into mechanical energy; and (d) passing the vapor phase working fluid from the expander to a condenser, wherein the vapor phase working fluid is condensed to the liquid phase working fluid. The preferred working fluid is an organic Rankine cycle system working fluid comprising compounds having the following general structure:

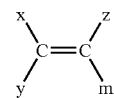

where x, y, z, and m are each selected from the group consisting of: fluorine, hydrogen, $R_f$, and R, wherein R and $R_f$ are each an alkyl, aryl, or alkylaryl of 1 to 6 carbon atoms, and wherein $R_f$ is partially or fully fluorinated.

24 Claims, 3 Drawing Sheets

U.S. PATENT DOCUMENTS

| | | |
|---|---|---|
| 6,374,907 B1 | 4/2002 | Tousignant et al. |
| 6,423,673 B1 * | 7/2002 | Owens et al. ............... 510/177 |
| 6,598,397 B2 * | 7/2003 | Hanna et al. .................. 60/651 |
| 6,883,328 B2 * | 4/2005 | Bronicki ...................... 60/670 |
| 6,991,744 B2 * | 1/2006 | Mahler et al. ................. 252/68 |
| 7,189,884 B2 * | 3/2007 | Mukhopadhyay et al. ... 570/160 |
| 7,208,099 B2 * | 4/2007 | Minor et al. .................. 252/68 |
| 2004/0119047 A1 * | 6/2004 | Singh et al. ................... 252/71 |
| 2005/0151110 A1 * | 7/2005 | Minor et al. ................... 252/67 |
| 2005/0151113 A1 * | 7/2005 | Minor et al. ................... 252/68 |
| 2005/0241805 A1 * | 11/2005 | Singh et al. ............. 165/104.12 |
| 2005/0262842 A1 | 12/2005 | Claasen et al. |

FOREIGN PATENT DOCUMENTS

| | | |
|---|---|---|
| WO | WO98/06791 | 2/1998 |
| WO | WO 2004/033859 | 4/2004 |

* cited by examiner

WORKING FLUIDS FOR THERMAL ENERGY CONVERSION OF WASTE HEAT FROM FUEL CELLS USING RANKINE CYCLE SYSTEMS

BACKGROUND OF THE INVENTION

1. Field of the Invention

The present invention generally relates to novel working fluids uniquely designed for higher cycle efficiencies, thereby leading to higher overall system efficiencies and therefore lower fuel consumption and lower emissions levels. In particular, these working fluids are useful in Rankine cycle systems for efficiently converting waste heat generated from industrial processes, such as electric power generation from fuel cells, into mechanical energy.

2. Discussion of the Background Art

Rankine cycle systems are known to be a simple and reliable means to convert heat energy into mechanical shaft power. Organic working fluids are useful in place of water/steam when low-grade thermal energy is encountered. Water/steam systems operating with low-grade thermal energy (typically 400° F. and lower) will have associated high volumes and low pressures. To keep system size small and efficiency high, organic working fluids with boiling points near room temperature are employed. Such fluids would have higher gas densities lending to higher capacity and favorable transport and heat transfer properties lending to higher efficiency as compared to water at low operating temperatures. In industrial settings there are more opportunities to use flammable working fluids such as toluene and pentane, particularly when the industrial setting has large quantities of flammables already on site in processes or storage. For instances where the risk associated with use of a flammable working fluid is not acceptable, such as power generation in populous areas or near buildings, other fluids such as CFC-113 and CFC-11 were used. Although these materials were non-flammable, they were a risk to the environment because of their ozone-depletion potential. Ideally, the organic working fluid should be environmentally acceptable, non-flammable, of a low order of toxicity, and operate at positive pressures.

Organic Rankine cycle systems are often used to recover waste heat from industrial processes. In combined heat and power (cogeneration) applications, waste heat from combustion of fuel used to drive the prime mover of a generator set is recovered and used to make hot water for building heat, for example, or for supplying heat to operate an absorption chiller to provide cooling. In some cases, the demand for hot water is small or does not exist. The most difficult case is when the thermal requirement is variable and load matching becomes difficult, confounding efficient operation of the combined heat and power system. In such an instance, it is more useful to convert the waste heat to shaft power by using an organic Rankine cycle system. The shaft power can be used to operate pumps, for example, or it may be used to generate electricity. By using this approach, the overall system efficiency is higher and fuel utilization is greater. Air emissions from fuel combustion can be decreased since more electric power can be generated for the same amount of fuel input.

U.S. Pat. No. 6,365,289, which is incorporated in its entirety, articulates that an organic Rankine cycle can be used to produce shaft work to operate fuel cell system components, such as an air compressor, in order to produce compressed air used in the fuel cell stack. It states that the working fluid can be heated by an external boiler or by one of the components of the fuel cell system, such as the combustor and/or the fuel cell stack. This treatment does not address utilization of waste heat for the purpose of increasing overall system efficiency or the management of fuel cell system temperatures which would provide improved process stability and system reliability/integrity, such as that disclosed hereinafter by the present invention.

One of the benefits of the present invention is that the present inventors have unexpectedly determined that the use of an organic Rankine cycle scaled to utilize the available fuel cell waste heat can generate additional electric power. Because the electrical power output of the fuel cell and appended organic Rankine cycle system is greater than that of the fuel cell alone and the fuel energy input is constant, the result of the present invention is an increase in overall thermal efficiency. Organic Rankine cycle offers an advantage over combined heat and power (cogeneration) processes in that no load matching is required. In many cases, load matching can be difficult to accomplish. In cases where there is no thermal requirement, a combined heat and power process could not be utilized; however, an appended organic Rankine cycle system remains an advantageous means to improve fuel cell system overall efficiency.

Currently, fuel cell development and commercialization is underway. Various types of fuel cells are being used for power generation at scales ranging from utility power generation down to power supplies for portable computers. Some fuel cell designs, such as proton exchange membrane types, do not generate significantly high temperatures, around 100° C. or so, and would not have adequate levels of thermal energy for use of organic Rankine cycle. Other designs, such as phosphoric acid fuel cells, operate at moderate temperatures and would lend well to the use of organic Rankine cycle systems for thermal energy conversion. Rankine cycle systems running with water or silicones as the working fluid are efficient when the waste heat is available at high temperature. High temperature fuel cells such as molten carbonate or solid oxide fuel cells would be an example. Nonetheless, organic working fluids with adequate thermal stability and low-to-moderate vapor pressure can be used practically to utilize waste heat from high-temperature sources provided organic Rankine cycle systems are properly designed. For example, the heat recovery heat exchanger would be designed to provide high flow rates and low heat flux in the first portion of the heat exchanger thus protecting the organic Rankine cycle working fluid from thermal decomposition until the source-side temperature was brought down to that where work extraction could take place for the given working fluid.

Fuel cells are meant to be a reliable, environmentally friendly source of electric power. Although flammable or combustible working fluids can be used in organic Rankine cycle systems, when considering fuel cells that integrate Rankine cycle systems to improve overall efficiency, selection of a non-flammable, low toxicity, environmentally friendly working fluid is an important factor. A non-flammable, low toxicity fluid contributes to reliability and safety. A non-flammable working fluid will not likely jeopardize the system or fire safety of the surroundings if internal or external forces or events such as ignition sources interact with the working fluid. Fluids with a low order of toxicity and favorable environmental properties such as low global warming potential bring less impact to the environment and its inhabitants if there are exposures or releases.

The working fluids of the present inventions uniquely provide higher cycle efficiencies in Rankine cycle systems that in turn result in higher overall system efficiencies and therefore lower fuel consumption and lower emissions levels.

SUMMARY OF THE INVENTION

A process for recovering waste heat which comprises: (a) passing a liquid phase working fluid through a heat exchanger in communication with a process which produces said waste heat; (b) removing a vapor phase working fluid from said heat exchanger; (c) passing said vapor phase working fluid to an expander, wherein said waste heat is converted into mechanical energy; and (d) passing said vapor phase working fluid from said expander to a condenser, wherein said vapor phase working fluid is condensed to said liquid phase working fluid. Optimally, the liquid phase working fluid from step (d) is recycled to step (a) via a pump.

The working fluid is preferably at least one working fluid selected from the group consisting of: organic Rankine cycle system working fluids, water, silicones, aliphatic hydrocarbons, cyclic hydrocarbons, aromatic hydrocarbons, olefins, hydrofluorocarbons, hydrofluoroethers, perfluoroethers, alcohols, ketones, fluorinated ketones, fluorinated alcohols, esters, and phosphate esters.

The organic Rankine cycle system working fluids comprise compounds having the following general structure:

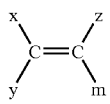

where x, y, z, and m are each selected from the group consisting of: fluorine, hydrogen, $R_f$, and R, wherein R and $R_f$ are each an alkyl, aryl, or alkylaryl of 1 to 6 carbon atoms, and wherein $R_f$ is partially or fully fluorinated.

Additional, organic Rankine cycle system working fluids according to the present invention may include at least one compound selected from the group consisting of:
1,1,1,2,2,4,4,4-octafluorobutane,
2-trifluoromethyl 1,1,1,3,3-pentafluoropropane,
1,1,1,2,2,3,3,4-octafluorobutane,
1,1,1,2,2,3,3,4,4-nonafluorobutane,
trifluoromethyl 1,1,1,2,2-pentafluoropropyl ether or 3-trifluoromethoxy 1,1,1,2,2, pentafluoropropane,
1,1,1-trifluoroethyl perfluoroethyl ether or 2-perfluoroethoxy 1,1,1-trifluoroethane,
2-trifluoromethyl 1,1,1,3,3,3-hexafluoropropane or 2-H perfluoroisobutane,
methyl (1,1,1,2,3,3,3-heptafluoropropane)-2-ether or 2-methoxy perfluoropropane,
methyl 1,1,1,2,2,3,3-heptafluoropropane ether or 3-methoxy perfluoropropane,
1,2,2,2-tetrafluoroethyl 1,1,1,2,2,3,3-heptafluoropropane ether or 2-perfluoropropoxy 1,1,1,2-tetrafluoroethane,
perfluoro-tertiary butyl alcohol,
1,1,2,2,3,3,4,4-octafluorobutane,
1,1,1,2,2,3,3,4,4,5,5-undecafluoropentane,
1,1,1,2,3,4,4,5,5,5-decafluoropentane,
4-trifluoromethyl-1,1,1,3,5,5,5-heptafluoro-2-pentene,
cyclo-1,1,2,2,3,4,-hexafluorobutane,
cyclo-1,1,2,2,3,3,4,4,5,5-decafluoropentane, and
H-dodecafluoropentane isomers.

More preferably, the compounds of the organic Rankine cycle system working fluids have the formula $C_{x'}F_{y'}H_{z'}$ where x' is 12–b, where b is an integer from between about 0 to about 6, y' is 2x'–z', and for x'/2 and 2x'/3 equals integers then z' is 2x'/3; for x'/2 and 3x'/4 equals integers then z' is 3x'/4; for x'/2 not equal to integer then z' is x'–2; for x'/2 and x'/5 equals integers then z' is x'–3. Moreover, the organic Rankine cycle system working fluid is either (a) a saturated compound derived by reacting HF with any of the compounds or (b) the compounds derived by reduction with hydrogen. The preferred compound is 4-trifluoromethyl-1,1,1,3,5,5,5-heptafluoro-2-pentene.

The process that produces waste heat is at least one selected from the group consisting of: fuel cells, internal combustion engines, internal compression engines, external combustion engines, and turbines. Other sources of waste heat can be found in association with operations at oil refineries, petrochemical plants, oil and gas pipelines, chemical industry, commercial buildings, hotels, shopping malls, supermarkets, bakeries, food processing industries, restaurants, paint curing ovens, furniture making, plastics molders, cement kilns, lumber kilns (drying), calcining operations, steel industry, glass industry, foundries, smelting, air-conditioning, refrigeration, and central heating.

The recovery process further comprises a secondary heat exchanger loop disposed between the heat exchanger in step (a) and the process which produces the waste heat. The secondary heat exchanger loop comprises passing a secondary fluid in communication with both the heat exchanger and the process which produces the waste heat, thereby transferring the waste heat from the process to the secondary fluid which thereafter transfers the waste heat from the secondary fluid to the liquid phase working fluid. The secondary fluid is at least one high-boiling point fluid, e.g., glycols, silicones, other essentially non-volatile fluids and mixtures thereof.

A process for recovering heat that comprises: (a) passing a liquid phase working fluid through at least a first heat exchanger in communication with a process which produces the waste heat; (b) removing a warmed liquid phase working fluid from the first heat exchanger; and (c) passing the warmed liquid phase working fluid to at least a second heat exchanger, wherein the warmed liquid phase transfers heat to a another fluid.

DETAILED DESCRIPTION OF THE PREFERRED EMBODIMENT

Figure 1:
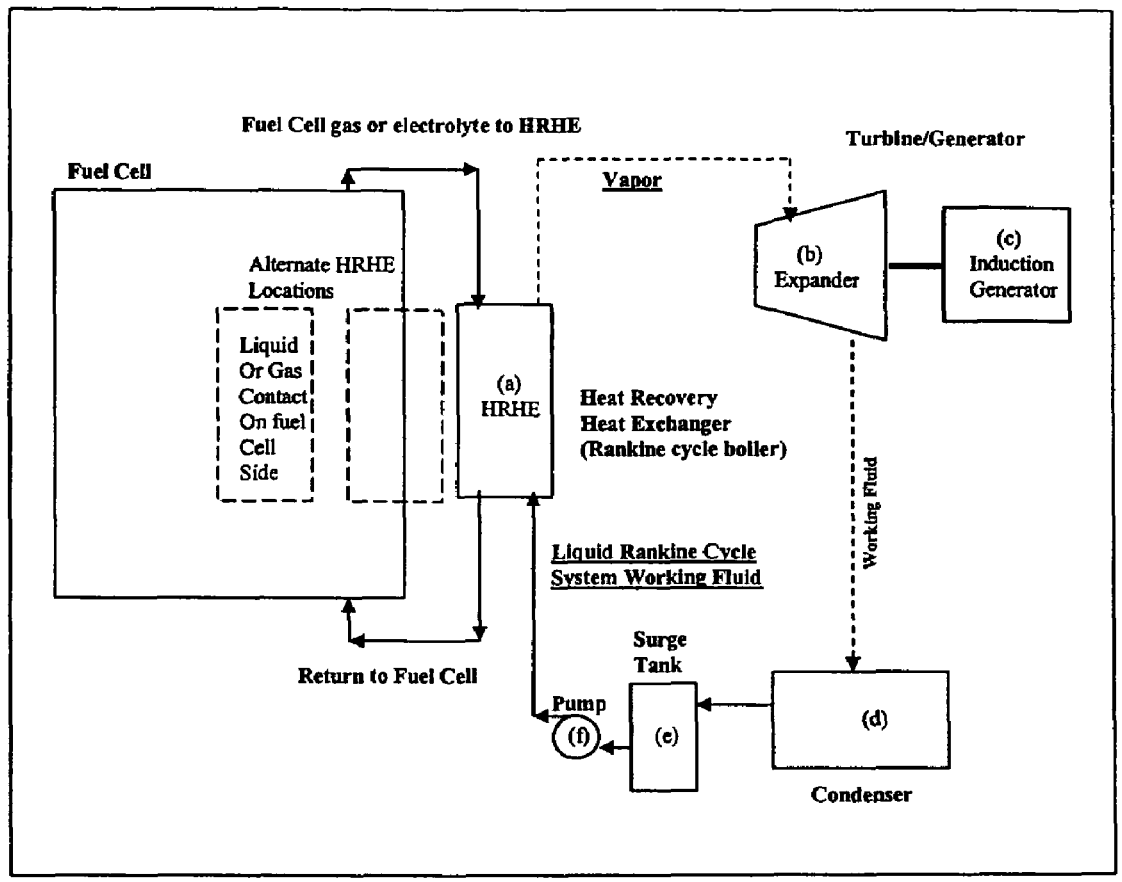
FIG. 1 is a block diagram of a fuel cell and Rankine cycle system in direct heat exchange according to the present invention.

To better understand how organic Rankine cycle equipment can be configured to utilize waste heat from fuel cells, a diagram of a basic equipment configuration is provided in FIG. 1. A heat recovery heat exchanger (a) transfers heat generated within the fuel cell to the Rankine cycle system working fluid. The heat exchanger can be located internal or external to the fuel cell. When the heat recovery heat exchanger is located outside the fuel cell, in its simplest form, a tube or tubes would convey hot gas or liquid electrolyte from the fuel cell to the external heat recovery heat exchanger (Rankine cycle system boiler) and then return the cooler fluid to the fuel cell to complete the loop. When the heat exchanger is inside the fuel cell, it can be located in the gas space, in the liquid portion of the fuel cell (electrolyte), or it may be located so that it contacts both liquid and gas within the fuel cell. In these arrangements, a tube or tubes carrying Rankine cycle system working fluid into and out of the fuel cell would constitute the heat recovery heat exchanger is simple form. The exchanger could also be located partially within and partially outside the fuel cell. For instance, the outer portion of the heat exchanger could be used to reject heat to the air. The heat recovery heat exchanger could be configured to reject any heat not delivered to the Rankine cycle system, for example, when the Rankine cycle system may be off-line or during transient conditions, such as start-up and shut-down. The heat could be rejected to air or to water using known heat rejection equipment designs and principles. Heat exchanger design can be fin/plate, shell/tube, fin/tube, microchannel, including double-wall or other designs that would be obvious to those skilled in the art.

The Rankine cycle system working fluid circulates through the heat recovery heat exchanger where it gains heat. The liquid working fluid converts to vapor in the heat recovery heat exchanger. The working fluid vapor is routed to the expander (b) where the expansion process results in conversion of the heat energy into mechanical shaft power. The shaft power can be used to do any mechanical work by employing conventional arrangements of belts, pulleys, gears, transmissions or similar devices depending on the desired speed and torque required. Importantly, the shaft can be connected to an electric power-generating device (c) such as an induction generator. The electricity produced can be used locally or delivered to the grid. Working fluid that exits the expander continues to the condenser (d) where adequate heat rejection causes the fluid to condense to liquid. It is also desirable to have a liquid surge tank (e) located between the condenser and pump to ensure there is always and adequate supply of liquid to the pump suction. The liquid flows to a pump (f) that elevates the pressure of the fluid to that it can be introduced back into the heat recovery heat exchanger thus completing the Rankine cycle loop.

Figure 2:
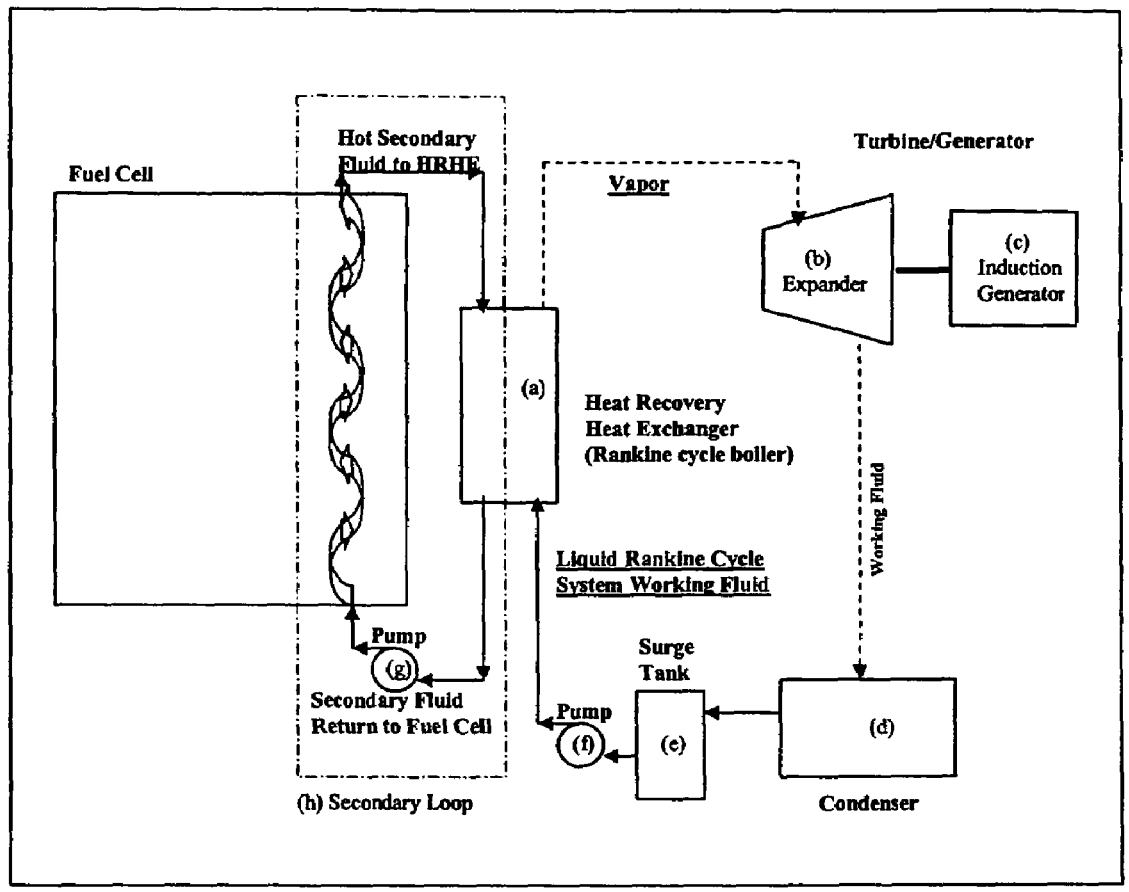
FIG. 2 is a block diagram of a fuel cell and Rankine cycle system with a secondary heat exchange arrangement according to the present invention.

In FIG. 2, is described an alternate equipment arrangement that utilizes a secondary heat exchange loop operating between the fuel cell and the Rankine cycle system. This arrangement offers another means of removing heat from the fuel cell and delivering it to the Rankine cycle system. This arrangement provides flexibility by facilitating the use of various fluids for sensible heat transfer. In fact, the working fluids of this invention can be used as secondary heat exchange loop fluids provided the pressure in the loop is maintained at or above the fluid saturation pressure at the temperature of the fluid in the loop. Additionally, high-boiling point fluids such as glycols and their brines, silicones, or other essentially non-volatile fluids may be used for sensible heat transfer in the secondary loop arrangement described. A secondary heat exchange loop can make servicing of either the fuel cell or Rankine cycle system less difficult since the two systems can be more easily isolated or separated. This approach can simplify the heat recovery heat exchanger design as compared to the case of having a heat exchanger with a high mass flow/low heat flux portion followed by a high heat flux/low mass flow portion. Organic compounds often have an upper temperature limit above which thermal decomposition will occur. The onset of thermal decomposition relates to the particular structure of the chemical and thus varies for different compounds. In order to access a high-temperature source using direct heat exchange with the working fluid, design considerations for heat flux and mass flow, as mentioned above, can be employed to facilitate heat exchange while maintaining the working fluid below its thermal decomposition onset temperature. Direct heat exchange in such a situation typically requires additional engineering and mechanical features which drive up cost. In such situations, a secondary loop design may facilitate access to the high-temperature heat source by managing temperatures while circumventing the concerns enumerated for the direct heat exchange case. This approach also can provide more freedom to retrofit to future improved working fluids in the Rankine cycle system without having to disturb or alter the fuel cell package. A cost-risk/benefit analysis is often conducted in order to determine the best approach (direct or indirect heat exchange) for a particular application.

Rankine cycle components (b) through (f) are essentially the same as described for FIG. 1. A liquid pump (g) circulates the secondary fluid through loop (h) so that it enters the portion of the loop in the fuel cell where it gains heat. The fluid then passes to the heat recovery heat exchanger (a) where the secondary fluid gives up heat to the Rankine cycle working fluid. Although not shown, another alternative heat exchange arrangement would be to have a secondary loop heat exchanger such that the secondary fluid would loop to the Rankine cycle system working fluid in the boiler. Heat from the fuel cell would be conveyed by circulating fuel cell gas or liquid electrolyte to the secondary loop heat exchanger via a circuit or circuits to exchange heat with the separate circuit or circuits that circulate the secondary fluid to and from the Rankine cycle system boiler.

Fuel cell waste heat temperatures vary by fuel cell type (e.g., molten carbonate, solid oxide, or phosphoric acid) and thus different working fluids can be used to address the various temperatures of the source waste heat. Fluid selection depends on a variety of factors including temperature match, thermodynamic properties, heat transfer properties, cost, safety concerns, environmental acceptability, and availability. Working fluids that are suitable include water, silicones, aliphatic hydrocarbons, cyclic hydrocarbons, aromatic hydrocarbons, olefins, hydrofluorocarbons (including alkanes and alkenes, cyclic compounds), hydrofluoroethers, perfluoroethers, alcohols, ketones, fluorinated ketones, fluorinated alcohols, esters, phosphate esters. Other fluids that are suitable are described in copending U.S. patent application Ser. No. 10/790,303, filed on Mar. 1, 2004, which is incorporated herein by reference. In addition to the fluids mentioned above for use in the processes of this invention, a number of preferred fluids have been identified that are useful in the processes of this invention and other Rankine cycle applications such as recovery of waste heat from mobile and stationary internal combustion engines, internal compression engines, external combustion engines and turbines. Stationary applications of these prime movers are typically for electric power generation. These fluids would also be useful as working fluids for geothermal- and solar-driven organic Rankine cycle systems, high-temperature heat pump applications, high-temperature cooling applications, autocascade refrigeration system refrigerant blend components, and heat transfer brines. Included among the fluids that are useful in the process of the invention are the preferred compounds of the structure

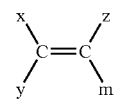

where x, y, z, and m are each selected from the group consisting of: fluorine, hydrogen, $R_f$, and R, wherein R and $R_f$ are each an alkyl, aryl, or alkylaryl of 1 to 6 carbon atoms, and wherein $R_f$ is partially or fully fluorinated. Also among the preferred are saturated compounds derived by reacting the aforementioned compounds with HF and those compounds derived by reduction with hydrogen.

Other preferred compounds are as follows:
1,1,1,2,2,4,4,4-octafluorobutane [$CF_3$ $CF_2$ $CH_2$ $CF_3$]
2-trifluoromethyl 1,1,1,3,3-pentafluoropropane [$(CF_3)_2$ CH $CHF_2$]
1,1,1,2,2,3,3,4-octafluorobutane [$CF_3$ $CF_2$ $CF_2$ $CH_2F$]
1,1,1,2,2,3,3,4,4-nonafluorobutane [$CF_3$ $CF_2$ $CF_2$ $CHF_2$]
trifluoromethyl 1,1,1,2,2-pentafluoropropyl ether or 3-trifluoromethoxy 1,1,1,2,2, pentafluoropropane [CF3 CF2 CH2—O—CF3]
1,1,1-trifluoroethyl perfluoroethyl ether or 2-perfluoroethoxy 1,1,1-trifluoroethane [CF3 CF2—O—CH2 CF3]
2-trifluoromethyl 1,1,1,3,3,3-hexafluoropropane or 2-H perfluoroisobutane [(CF3)3 CH]
methyl (1,1,1,2,3,3,3-heptafluoropropane)-2-ether or 2-methoxy perfluoropropane [(CF3)2 CF—O—CH3]
methyl 1,1,1,2,2,3,3-heptafluoropropane ether or 3-methoxy perfluoropropane [CF3 CF2 CF2—O—CH3]
1,2,2,2-tetrafluoroethyl 1,1,1,2,2,3,3-heptafluoropropane ether or 2-perfluoropoxy 1,1,1,2-tetrafluoroethane [$CF_3CF_2CF_2$—O—CHF $CF_3$]
perfluoro-tertiary butyl alcohol [$(CF_3)_3$ C—OH]
1,1,2,2,3,3,4,4-octafluorobutane [$CHF_2$ $CF_2$ $CF_2$ $CHF_2$]
1,1,1,2,2,3,3,4,4,5,5-undecafluoropentane [$CF_3$ $CF_2$ $CF_2$ $CF_2$ $CHF_2$]
1,1,1,2,3,4,4,5,5-decafluoropentane [$CF_3$ CHF CHF $CF_2$ $CF_3$]
cyclo-1,1,2,2,3,4,-hexafluorobutane [—$CF_2CF_2$CHF CHF—]
cyclo-1,1,2,2,3,3,4,4,5,5-decafluoropentane [—$CF_2CF_2CF_2CF_2CF_2$—]
H-dodecafluoropentane isomers Most preferred are compounds of the formula CxFyHz where x=12−b where b is from 0 to 6, y =2x−z, and for x/2 and 2x/3=integers then z=2x/3; for x/2 and 3x/4=integers then z=3x/4; for x/2 ≠integer then z=x−2; for x/2 and x/5=integers then z=x−3. Also most preferred are the saturated compounds derived by reacting HF with the aforementioned compounds and those compounds derived by reduction with hydrogen.

The present invention meets the need in the art for a working fluid that has a low ozone depletion potential and is a negligible contributor to green-house global warming compared with fully halogenated CFC and partially halogenated HCFC materials. These materials have the proper boiling points and thermodynamic characteristics that would be usable in thermal energy conversion to mechanical shaft power and electric power generation; they could take advantage of some of the latent heat contained in low-pressure steam that is presently not well utilized. The above listed materials may be employed to extract additional mechanical energy from low grade thermal energy sources such as industrial waste heat, solar energy, geothermal hot water, low-pressure geothermal steam (primary or secondary arrangements) or distributed power generation equipment utilizing fuel cells or prime movers such as turbines, microturbines, or internal combustion engines. Low-pressure steam can also be accessed in a process known as a binary Rankine cycle. Large quantities of low-pressure steam can be found in numerous locations, such as in fossil fuel powered electrical generating power plants. The particular fluid could be tailored to suit the power plant coolant quality (its temperature), maximizing the efficiency of the binary cycle.

The present invention is more fully illustrated by the following non-limiting examples. In the following examples the thermodynamic properties of 4-trifluoromethyl-1,1,1,3,5,5,5-heptafluoro-2-pentene $((CF_3)_2CHCF=CHCF_3)$ and 1,1,1,3,3-pentafluoropropane (HFC-245fa) are needed. In order to model thermodynamics of the compounds of the invention, an equation of state must be selected. The corresponding-states principle is an effective basis for thermophysical property estimation. Lee and Kesler (Lee, B. I. And Kesler, M. G.; AIChE J.; 21; 510 (1975)) developed an extended corresponding states method that utilizes two reference fluids in order to predict thermodynamic properties. The two reference fluids originally chosen by Lee and Kesler were a "simple fluid" and n-octane. If thermodynamic properties of a particular family of compounds (e.g., fluorinated compounds) is desired the accuracy of the Lee and Kesler method can be improved by substituting the n-octane reference fluid with a reference fluid from the family of interest. Sörner and Ström (Sörner, M. and Ström; Can. J. Chem. Eng.; 73; 854 (1995)) reported the constants needed to substitute HFC-134a (1,1,1,2-tetrafluorotheane) as the reference fluid. If HFC-134a replaces n-octane as the reference fluid the resulting extended corresponding states method can now be used to accurately model the thermodynamic properties of fluorinated compounds. Now that an equation of state has been selected the properties of a Rankine cycle are calculated following the procedure described by Smith, Van Ness and Abbott (Smith, J. M., Van Ness, H. C. and Abbott, M. M.; Introduction to Chemical Engineering Thermodynamics; The McGraw-Hill Companies, Inc; New York (1996)). These properties are used to calculate "net work" and cycle efficiency. Required inputs for this estimation include critical temperature, critical pressure, acentric factor and ideal gas heat capacity. The pump and expander in the Rankine cycle are assumed to operate isentropically. For 4-trifluoromethyl-1,1,1,3,5,5,5-heptafluoro-2-pentene $((CF_3)_2CHCF=CHCF_3)$, the ideal gas heat capacity was calculated using commercially available CS Chem 3D Pro software from Cambridge Soft and the critical temperature and pressure were estimated using Joback's method (Joback, K. G. and Reid R. C.; Chem. Eng. Comm.; 57; 233 (1987)). In the case of HFC-245fa, the ideal gas heat capacity and critical properties were obtained using NIST Refprop 7.0 Software available from the National Institute of Standards and Technology. Acentric factors for 4-trifluoromethyl-1,1,1,3,5,5,5-heptafluoro-2-pentene $((CF_3)_2CHCF=CHCF_3)$ was calculated using Reidels method (Riedel, L; Chem. Ing. Tech.; 26; 679 (1954)). The critical temperature, critical pressure, ideal gas heat capacity and acentric factor of the 4-trifluoromethyl-1,1,1,3,5,5,5-heptafluoro-2-pentene $((CF_3)_2CHCF=CHCF_3)$ and HFC-245fa are given in Table 1.

TABLE 1

Properties Comparison

| Compound | 4-trifluoromethyl-1,1,1,3,5,5,5-heptafluoro-2-pentene | HFC-245fa | HCFC-123 |
|---|---|---|---|
| ODP/GWP* | 0/ | 0/950 | 0.02/110 |
| Heat Capacity (ideal gas, 77° F.), BTU/(lb-mol · ° F.) | 37.2 | 25.8 | 23.2 |
| Boiling Point, ° F. | 186.8 | 58.82 | 82.081 |
| Critical Temperature, ° F. | 446.62 | 309.29 | 362.63 |
| Critical Pressure, psi | 345.80 | 527.94 | 531.10 |
| Acentric Factor | 0.4626 | 0.3724 | 0.2819 |

TABLE 1-continued

Properties Comparison

| Compound | 4-trifluoromethyl-1,1,1,3,5,5,5-heptafluoro-2-pentene | HFC-245fa | HCFC-123 |
|---|---|---|---|
| Flame Limits, Vol % at 1 atm | None** | None | None |

*Ozone Depletion Potential/Global Warming Potential
**Flash point was run on this material since it is a room temperature liquid.

EXAMPLE 1

Optimize Cycle Efficiency for a Sub-Critical Organic Rankine Cycle

In organic Rankine cycle thermal to mechanical energy applications, increased cycle efficiency can be shown to be possible if the working fluid is properly matched to the source and sink temperature. To arrive, at the net work output, the absolute value of the enthalpy gain in the pump due to the increase in pressure in going from the condensing condition back to the boiler condition is subtracted from the absolute value of the difference in enthalpy values at the expander entrance (boiler exit) and expander exit. Dividing "net work output" by "heat input" to the boiler provides the cycle efficiency. The cycle efficiency is strongly dependent upon how far apart the source and sink temperatures are; increasing efficiency with greater temperature difference between source and sink. Moreover, for any given source and sink temperature set, cycle efficiency is increased by minimizing the temperature difference between the boiler (evaporating) and source and between the condensing condition and sink. In practical terms then, the cycle efficiency increases as the temperature difference between the evaporating and condensing conditions increases. The condensing condition was selected to be that of an air-cooled condensation. The condenser temperature is 95° F. (35° C.), which could easily be obtained by air-cooling. In this example, two conditions are examined for the evaporating temperature in order to highlight the interrelationship between critical temperature, efficiency and work output. In the first condition, the evaporating temperatures for the two fluids are the same. The evaporating temperature for 4-trifluoromethyl-1,1,1,3,5,5,5-heptafluoro-2-pentene ((CF$_3$)$_2$CHCF=CHCF$_3$) as well as HFC-245fa is taken to be 266° F. (130° C.). In the second condition, the evaporating temperatures are at the optimal values in terms of efficiency. The maximum efficiency is seen when there is the greatest difference between the evaporating and condensing temperatures. Therefore, the evaporating temperature is set to 15° F. (8.3° C.) below the critical temperature for the second case. At an evaporating temperature 15° F. (8.3° C.) below the critical temperature, both fluids in the example can be isentropically expanded without condensing. Table 2 shows the results of the two test conditions. When the evaporating temperature is same for the two fluids, in this case, 266° F. (130° C.), the thermal efficiencies of the two fluids are very similar. When the maximum temperature is used, the efficiency of 4-trifluoromethyl-1,1,1,3,5,5,5-heptafluoro-2-pentene ((CF$_3$)$_2$CHCF=CHCF$_3$) is much greater than that of HFC-254fa. This demonstrates the importance of having a high critical temperature so that more efficient cycles can be attained. Higher cycle efficiencies ultimately relate to higher overall system efficiencies and therefore lower fuel consumption and lower emissions levels.

TABLE 2

Increased work output and efficiency - boiler near critical temperature

| Condition | Units | HFC-245fa | | ((CF$_3$)$_2$CHCF=CHCF$_3$) | |
|---|---|---|---|---|---|
| | | 1st case | 2nd case | 1st case | 2nd case |
| Boiler Temperature | ° F. | 266.0 | 294.3 | 266.0 | 390.2 |
| Boiler Pressure | Psi | 338.6 | 440.8 | 71.5 | 280.7 |
| Condenser Temperature | ° F. | 95.0 | 95.0 | 95.0 | 95.0 |
| Condenser Pressure | Psi | 31.0 | 31.0 | 3.6 | 3.6 |
| Thermal Efficiency | | 0.175 | 0.186 | 0.172 | 0.215 |
| Work Turbine | BTU/lb-mol | 2445 | 2663 | 3683 | 5440 |
| Work Pump | BTU/lb-mol | 88 | 117 | 31 | 127 |
| Work net | BTU/lb-mol | 2357 | 2546 | 3651 | 5313 |

EXAMPLE 2

Figure 3:
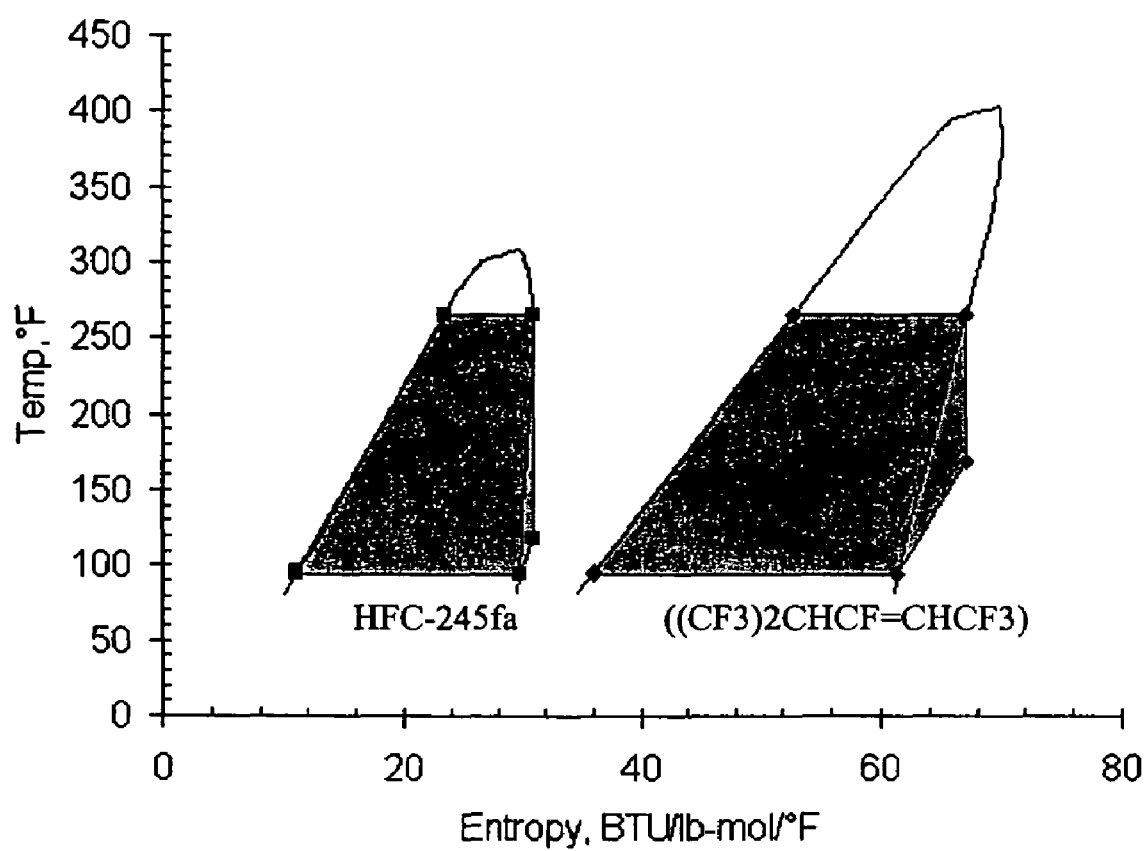
FIG. 3 is a chart plotting temperature versus entropy for 4-trifluoromethyl-1,1,1,3,5,5,5-heptafluoro-2-pentene $((CF_3)_2CHCF=CHCF_3)$ and HFC-245fa.

Work Output at Cycle Efficiency away from Optimum, Organic Rankine Cycle Process One way to assess the relative "goodness" of organic Rankine cycle working fluids is to compare theoretical cycle efficiency. However, many organic Rankine cycle systems utilize waste heat as the driver, hence cycle efficiency is typically not as important as the net work derived (work extracted during expansion less work of the pump). When an organic Rankine cycle is plotted on a temperature entropy diagram, the net work is related to the area under the curve traced out by the Rankine cycle (shaded area shown in FIG. 3). The amount of net work that a fluid can produce increases as the two-phase dome becomes broader (the heat capacity of the fluid increases) and as the critical temperature increases. The temperature versus entropy relationships are plotted for 4-trifluoromethyl-1,1,1,3,5,5,5-heptafluoro-2-pentene ((CF$_3$)$_2$CHCF=CHCF$_3$) and HFC-245fa in Table 1. Table 1 shows that 4-trifluoromethyl-1,1,1,3,5,5,5-heptafluoro-2-pentene ((CF$_3$)$_2$CHCF=CHCF$_3$) has the highest critical temperature, broadest two-phase dome and therefore the highest potential for net work. The shaded areas in FIG. 3 correspond to Example 1 where the evaporating and condensing temperatures are 266° F. (130° C.) and 95° F. (35° C.), respectively. In this case, Example 1 showed that the thermal efficiencies of the two fluids are very similar. Even with the similar thermal efficiency the net work produced by 4-trifluoromethyl-1,1,1,3,5,5,5-heptafluoro-2-pentene ((CF3)2CHCF=CHCF3) is greater than that produced by HFC-245fa by a factor of 1.5. When the fluids are operated at an evaporating temperature of 15° F. (8.3° C.) below their respective critical temperatures, 4-trifluoromethyl-1,1,1,3,5,5,5-heptafluoro-2-pentene ((CF3)2CHCF=CHCF3) is able to produce twice as much net work as HFC-245fa.

What is claimed is:

1. An organic Rankine cycle system comprising a working fluid comprising at least one compound having the following structure:

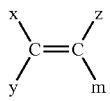

where x, y, z, and m are each selected from the group consisting of: fluorine, hydrogen, $R_f$, and R, wherein R and $R_f$ are each an alkyl, aryl, or alkylaryl of 1 to 6 carbon atoms, and wherein $R_f$ is partially or fully fluorinated, wherein said compounds have the formula $C_{x'}F_{y'}H_{z'}$, where x' is 12-b, where b is an integer from between about 0 to about 6, y' is 2x'−z', and for x'/2 and 2x'/3 equals integers then z' is 2x'/3; for x'/2 and 3x'/4 equals integers then z' is 3x'/4; for x'/2 not equal to integer then z' is x'−2; for x'/2 and x'/5 equals integers then z' is x'−3; and a heat exchanger.

2. The organic Rankine cycle system according to claim 1, wherein said working fluid further comprises (a) a saturated compound derived by reacting HF with any of said compounds or (b) a compound derived from said compounds by reduction with hydrogen.

3. An organic Rankine cycle system working fluid comprising 4-trifluoromethyl-1,1,1,3,5,5,5-heptafluoro-2-pentene.

4. The organic Rankine cycle system according to claim 1, wherein said working fluid further comprises at least one compound selected from the group consisting of: water, silicones, aliphatic hydrocarbons, cyclic hydrocarbons, aromatic hydrocarbons, olefins, hydrofluorocarbons, hydrofluoroethers, perfluoroethers, alcohols, ketones, fluorinated ketones, fluorinated alcohols, esters, and phosphate esters.

5. A process for recovering waste heat that comprises: (a) passing a liquid phase working fluid through a heat exchanger in communication with a process which produces said waste heat; (b) removing a vapor phase working fluid from said heat exchanger; (c) passing said vapor phase working fluid to an expander, wherein said waste heat is convened into mechanical energy; and (d) passing said vapor phase working fluid from said expander to a condenser, wherein said vapor phase working fluid is condensed to said liquid phase working fluid; wherein said working fluids comprise at least one compound having the following structure:

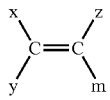

where x, y, z, and m are each selected from the group consisting of: fluorine, hydrogen, $R_f$, and R, wherein R and $R_f$ are each an alkyl, aryl, or alkylaryl of 1 to 6 carbon atoms, and wherein $R_f$ is partially or fully fluorinated, wherein said compounds have the formula $C_{x'}F_{y'}H_{z'}$, where x' is 12-b, where b is an integer from between about 0 to about 6, y' is 2x'−z', and for x'/2 and 2x'/3 equals integers then z' is 2x'/3; for x'/2 and 3x'/4 equals integers then z' is 3x'/4; for x'/2 not equal to integer then z' is x'−2; for x'/2 and x'/5 equals integers then z' is x'−3.

6. A process for recovering waste heat that comprises: (a) passing a liquid phase working fluid through a heat exchanger in communication with a process which produces said waste heat; (b) removing a vapor phase working fluid from said heat exchanger; (c) passing said vapor phase working fluid to an expander, wherein said waste heat is converted into mechanical energy; and (d) passing said vapor phase working fluid from said expander to a condenser, wherein said vapor phase working fluid is condensed to said liquid phase working fluid; wherein said working fluid comprises 4-trifluoromethyl-1,1,1,3,5,5,5-heptafluoro-2-pentene.

7. The process according to claim 5, wherein said process that produces waste heat is at least one selected from the group consisting of: fuel cells, internal combustion engines, internal compression engines, external combustion engines, and turbines.

8. The process according to claim 5, further comprising a secondary heat exchanger loop disposed between said heat exchanger in step (a) and said process which produces said waste heat.

9. The process according to claim 8, wherein said secondary heat exchanger loop comprises passing a secondary fluid in communication with both said heat exchanger and said process which produces said waste heat, thereby transferring said waste heat from said process to said secondary fluid which thereafter transfers said waste heat from said secondary fluid to said liquid phase working fluid.

10. The process according to claim 9 wherein said secondary fluid comprises at least one compound having the following structure:

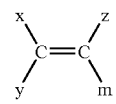

where x, y, z, and m are each selected from the group consisting of: fluorine, hydrogen, $R_f$, and R, wherein R and $R_f$ are each an alkyl, aryl, or alkylaryl of 1 to 6 carbon atoms, and wherein $R_f$ is partially or fully fluorinated.

11. The process according to claim 9, wherein said secondary fluid is at least one high-boiling point fluid.

12. The process according to claim 9, wherein said secondary fluid is at least one selected from the group consisting of: glycols, silicones and other essentially non-volatile fluids.

13. The process according to claim 5, wherein said process that produces waste heat is at least one operation associated with at least one industry selected from the group consisting of: oil refineries, petrochemical plants, oil and gas pipelines, chemical industry, commercial buildings, hotels, shopping malls, supermarkets, bakeries, food processing industries, restaurants, paint curing ovens, furniture making, plastics molders, cement kilns, lumber kilns, calcining operations, steel industry, glass industry, foundries, smelting, air-conditioning, refrigeration, and central heating.

14. A process for recovering heat that comprises: (a) passing a liquid phase working fluid through at least a first heat exchanger in communication with a process which produces said waste heat; (b) removing a warmed liquid phase working fluid from said first heat exchanger; (c) passing said warmed liquid phase working fluid to at least a second heat exchanger, wherein said warmed liquid phase transfers heat to a working fluid according to claim 1.

15. The organic Rankine system of claim 3, wherein the working fluid consists essentially of 4-trifluoromethyl-1,1,1, 3,5,5,5-heptafluoro-2-pentene.

16. The process of claim 10, wherein said secondary fluid comprises 4-trifluoromethyl-1,1,1,3,5,5,5-heptafluoro-2-pentene.

17. The Organic Rankine system of claim 1, wherein b=0.
18. The Organic Rankine system of claim 1, wherein b=1.
19. The Organic Rankine system of claim 1, wherein b=2.

20. The Organic Rankine system of claim 1, wherein b=3.
21. The Organic Rankine system of claim 1, wherein b=4.
22. The Organic Rankine system of claim 1, wherein b=5.
23. The Organic Rankine system of claim 1, wherein b=6.
24. The process according to claim 9 wherein said secondary fluid comprises at least one working fluid comprising at least one compound selected from the group consisting of:
1,1,1,2,2,4,4,4-octafluorobutane,
2-trifluoromethyl 1,1,1,3,3-pentafluoropropane,
1,1,1,2,2,3,3,4-octafluorobutane,
1,1,1,2,2,3,3,4,4-nonafluorobutane,
trifluoromethyl 1,1,1,2,2-pentafluoropropyl ether or 3-trifluoromethoxy 1,1,1,2,2, pentafluoropropane,
1,1,1-trifluoroethyl perfluoroethyl ether or 2-perfluoroethoxy 1,1,1-trifluoroethane,
2-trifluoromethyl 1,1,1,3,3,3-hexafluoropropane or 2-H perfluoroisobutane,
methyl (1,1,1,2,3,3,3-heptafluoropropane)-2-ether or 2-methoxy perfluoropropane,
methyl 1,1,1,2,2,3,3-heptafluoropropane ether or 3-methoxy perfluoropropane,
1,2,2,2-tetrafluoroethyl 1,1,1,2,2,3,3-heptafluoropropane ether or 2-perfluoropropoxy 1,1,1,2-tetrafluoroethane,
perfluoro-tertiary butyl alcohol,
1,1,2,2,3,3,4,4-octafluorobutane,
1,1,1,2,2,3,3,4,4,5,5-undecafluoropentane,
1,1,1,2,3,4,4,5,5,5-decafluoropentane,
4-trifluoromethyl-1,1,1,3,5,5,5-heptafluoro-2-pentene,
cyclo-1,1,2,2,3,4-hexafluorobutane,
cyclo-1,1,2,2,3,3,4,4,5,5-decafluoropentane, and
H-dodecafluoropentane isomers.

* * * * *